June 17, 1958     W. B. KRIEWALL     2,839,433
ARC FLASH PREVENTING COATING FOR WELDING RODS
Filed Sept. 13, 1954
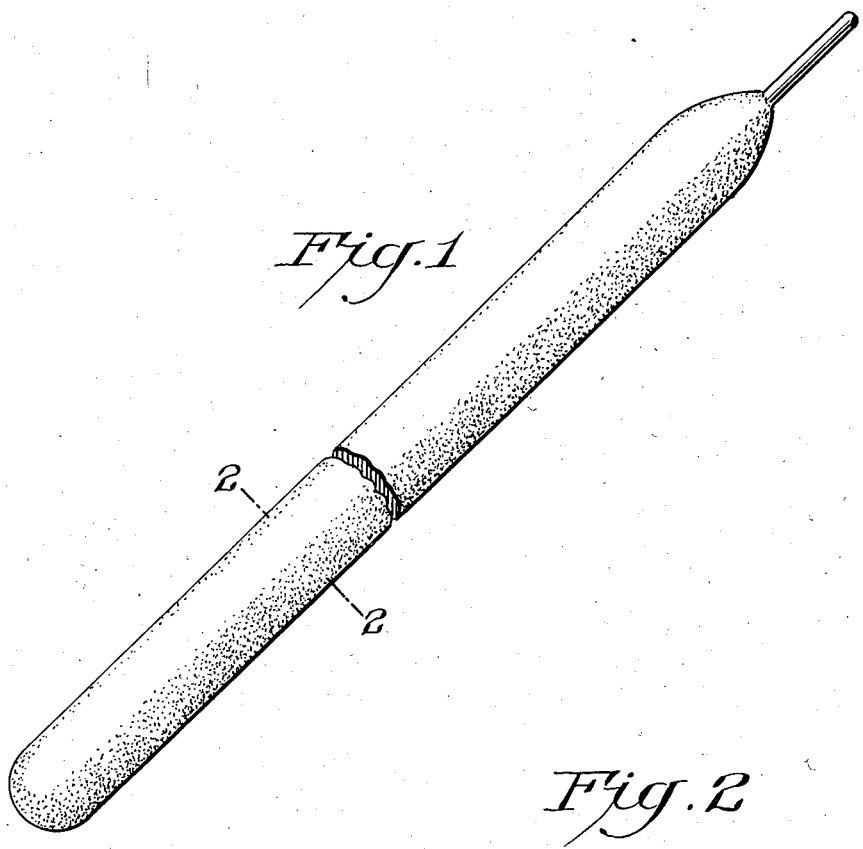
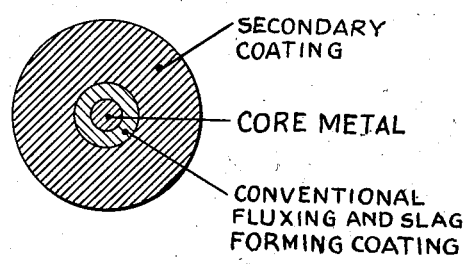
INVENTOR
William B. Kriewall
BY Connolly and Hutz
ATTORNEYS

United States Patent Office 2,839,433
Patented June 17, 1958

2,839,433

ARC FLASH PREVENTING COATING FOR WELDING RODS

William B. Kriewall, Flushing, N. Y., assignor to Eutectic Welding Alloys Corporation, Flushing, N. Y., a corporation of New York Application September 13, 1954, Serial No. 455,759

7 Claims. (Cl. 117—204)

This invention relates to coated welding rods for use in arc-welding procedures. More particularly, the invention relates to a coated welding rod of the contact welding type wherein the coated rod is drawn across the work piece while physically touching the surface thereof. In most instances, the rod is treated in such manner as to be self-starting, i. e., to initiate an arc between the work and the adjacent end of the conductive core material of the rod upon contact whereby a weld may be completed in a single pass by simply dragging the rod across the seam or joint to be welded.

This type welding procedure is well known to the art in which it has replaced the older conventional type electrodes which are operated without touching the work at any time except to initiate the arc at the beginning of the weld, but is used for only a limited number of applications. A primary reason for the failure to replace the older, set-spacing type welding rods and procedures in all applications with the simpler and more easily manipulated contact welding procedure has been an inability to provide a suitable coating or covering for the conductive core which would allow the rod to be supported by the work and yet physically position the conductive core in a predetermined position which is positively spaced from the work so as to preclude a wandering and unstable arc, or to at least avoid shorting the arc. In particular, the coating of the rod must have a particularly high softening temperature so as to form a support for the rod immediately adjacent the arc but yet thermally fuse at a rate equal to the rate of consumption of the core to avoid lengthening the arc as the core is consumed. At the same time, the covering must function as a flux, a deoxidizer and/or reducer, and as a source of shielding gas for the arc. Because of these complex prerequisite conditions, contact welding techniques have not been applied in many instances even though the advantages of such procedure have been long recognized.

According to the present invention, it has now been found that these inefficacies can be wholly overcome by the simple expedient of associating a large proportion of a secondary covering material of normally non-conductive particles with the conventional flux covering ingredients of the electrode.

In one form of the invention conventional fluxing and protective ingredients such as slag-forming agents, arc stabilizers, deoxidizers, shielding gas formers, alloying constituents, and the like are mixed in proportions according to known techniques in the conventional manner known in the art of electrode covers. But, in addition to these ingredients, it is proposed according to the present invention to apply at least an equal proportionate amount of a second material comprising substantially non-conductive particles combined in an intimate substantially uniformly dispersed covering composition consisting of substantially equal parts of silica and manganese dioxide held together by a sodium silicate or other binder and to which may be added alkaline metal fluorides such as calcium fluoride and alloy powders such as a silico-manganese alloy in relatively small proportional amounts.

In one form of the invention it is preferred to intimately mix approximately equal proportions of the secondary non-conductive material and the conventional covering ingredients together with a known binder, as for example, a water soluble silicate, and extrude the mixture as an integral plastic mass about the conductive core wire in a single operation.

In another form of the invention, it is preferred to apply the secondary covering material of non-conductive particles as an external layer about a conventional coated or covered electrode in which the underlying coating or covering has been formulated to include conventional arc stabilizing, deoxidizing, etc. components. In practice, this may be readily attained by first extruding a mixture of conventional covering materials at conventional thickness about a core wire, drying the extruded covered wire and subsequently extruding an external coating of the secondary covering material sufficient to make the radial thickness of the covered core a minimum of twice the thickness of the metallic core.

In some instances, it is desirable to include a relatively substantial proportion of arc stabilizers and/or alloying components as constituents in the secondary covering material. In other instances, it is desirable to employ a metal, plastic or fiber tube into which one or more previously coated or uncoated core wires can be placed and into which tube the secondary covering material may be forced, as by an injection molding operation or the like.

Application of this secondary covering material serves to form a support which will maintain the arcing end of the electrode in a predetermined, substantially unvarying spaced position with respect to the work piece whereby a contact welding technique can be used for any type metal joining, chamfering or gouging operation. It will be understood by those skilled in the art that it heretofore has not been economically feasible to apply conventional covering compositions to core wire in other than the minimum amount necessary to insure adequate functioning of the covered core as an electrode in the arc welding operation. Thus, conventional covering materials which are applied as coatings to 1/8" diameter electrodes normally approximate 0.0625" in radial thickness. The instant invention, on the other hand, envisions application of electrode coverings which are approximately twice as thick as the conventional coating found on a similar coated electrode for application in similar metal treatments, i. e., for a contemporary 1/8" diameter core wire having a covering of 0.0625" in radial thickness, the instant invention requires the use of a secondary coating of borax, boric acid, resin or enamel particles of about an equal thickness. In cases where the conventional coating ingredients and the secondary covering material are intimately and heterogeneously mixed, the total covering for the 1/8" diameter core should be approximately 0.250" in radial thickness as a minimum. It is generally preferred to employ the secondary covering material according to the invention as an independent external coating, since in such case it eliminates any necessity for the primary coating to perform any function other than its main one of aiding the arc welding operation and allows the most desirable covering compositions to be used without regard to the physical characteristics of the same. In any event, however, it is necessary that the total flux covering on the bare core wire be approximately two to three times the coating thickness recommended for covered cores for a similar purpose by the ASTM or AWS and as conventionally applied to such cores.

In experimenting with the new electrode of the invention, it further has been surprisingly discovered that the contact arc welding operation proceeds as a substantially submerged arc process in which the arc is completely shielded beneath the fusing secondary covering material which forms a heavy blanket completely enclosing the arc flame. Because of this unusual and totally unexpected phenomenon, it has been found possible to conduct a host of welding operations with different type welding electrodes on different type base materials without requiring protective shields or dark glasses for the operator. During the operation, the secondary covering disintegrates in such manner that it forms a covering puddle of molten flux between the end of the electrode and the work, preventing the arc flame from being visible from any angle. Another surprising effect is the fact that the flux melts and becomes substantially transparent as the electrode is dragged over the surface of the work so that the progress of the weld can be readily and easily discerned by the operator.

Having broadly described the invention, reference will now be made to several specific examples more particularly defining the same in conjunction with the accompanying drawings in which Fig. 1 is a perspective view of an embodiment of this invention, and Fig. 2 is an enlarged cross-sectional view taken through Fig. 1 along the line 2—2. These examples have been proven in practice to eliminate the necessity of using shielding helmets and/or special dark glasses in the welding operations.

A mixture of conventional electrode coating ingredients were compounded according to the teachings of U. S. Letters Patent No. 2,632,835 to Rene D. Wasserman, including calcium chloride, calcium carbonate, titanium dioxide, calcium silicate, chromium metal powder, and a ferro-silicon alloy mixed in paste form with a conventional binder and extruded upon a bare core wire of the stainless steel type as more particularly set forth in said patent. The extruded coating was dried by passing the covered wire through a furnace. It was subsequently overlaid with a thick external covering consisting of 42 parts silica, 42 parts manganese dioxide, 4 parts calcium fluoride, 5 parts silico-manganese and 8 parts sodium silicate formed as a paste and applied over the initial coating by an identical extrusion operation. As shown in Figs. 1 and 2, the initial extrusion operation was controlled so as to apply the conventional covering material as a coating of approximately 1/16" in radial thickness, while the second extruded operation was so controlled as to apply the secondary covering material as a coating of approximately 1/4" in radial thickness. The double-coated electrode was then dried in a furnace.

In a further operation the secondary covering material was applied over the initial coating on the electrode core before the initial coating was dried, and the double-coated wet core was then dried in a single pass through the furnace. No substantial defects were discovered upon inspecting the dried unit, and the overlying conventional coating retained its position in intimate contact with the core metal without evidencing excessive porosity.

In yet a further operation with the identical covering materials and core wire, the patented covering composition was mixed with an equal proportion of the same secondary covering composition until heterogeneously dispersed. The dispersed mixture was then formed into a paste by the addition of water and a water-soluble binding material and the paste so formed was extruded by a conventional extrusion press upon a 1/8" diameter core wire to a coating having a radial thickness of 1/4". The covered wire was then dried in a furnace in the usual manner. Upon inspection, it was noted that the distribution of the patented covering composition components was such as to concentrate these components in the region adjacent the core wire but with a concentration considerably less than that obtained when such components were applied as an independent initial covering as described previously.

In yet a further operation a molded pulp fiber tube of 7/16" diameter was positioned in a jig in alignment with the discharge nozzle of an injection molding machine and a pair of uncoated 1/16" diameter copper core wires were positioned internally of the tube parallel with the axis thereof in such manner as to maintain a spacing of 3/16" therebetween. Thereafter, the molding machine was loaded with a mixture of a covering composition compounded to contain 20 parts calcium carbonate, 24 parts calcium fluoride, 20 parts lepidolite, 5 parts talc, 15 parts titanium dioxide, 3 parts barium carbonate, 3 parts graphite, 4 parts copper-titanium alloy, 2 parts silicon-aluminum-manganese-iron alloy, 2 parts iron oxide and 2 parts zirconium silicate (all parts being by weight) and an equal amount of the same secondary covering material. The combined mixture was then injected into the tube filling the voids about the enclosed core wires and the filled tube dried in a furnace in the usual manner.

Additional examples were repeated, as indicated above, by applying the ground enamel as an independent secondary covering material for a coated core wire within the enclosing fiber tube; and over unenclosed coated core wires both independently and in multiple grouped arrays of different shape and number. Other examples were repeated by adding metal powders, such as iron, iron-aluminum alloy, and the like, as well as iron oxides, titanium dioxide, and the like, in amounts up to 15% by weight of the secondary covering material.

A particularly effective contact welding electrode was formed by first extruding an inert flux covering about a bare core wire, the flux covering having a composition within the following proportional ranges:

| | Percent |
|---|---|
| Titanium dioxide | 40 to 45 |
| Potassium aluminum silicate | 10 to 15 |
| Sodium potassium aluminum silicate | 10 to 15 |
| Potassium titanate | 5 to 7.5 |
| Calcium magnesium carbonate | 2 to 5 |
| Ferro vanadium | 1 to 2 |
| Organic filler | 1 to 2 |
| Ferro manganese | 3 to 4 |
| Aluminum silicate | 1 to 2 |
| Aluminum oxide | 2 to 5 | and then subsequently applying a second external covering composition to the covered electrode by an identical extrusion or simple dipping operation, the outer covering having a composition within the following proportional ranges:

| | Percent |
|---|---|
| Silica | 35 to 50 |
| Manganese dioxide | 35 to 50 |
| Calcium fluoride | 3 to 5 |
| Silico manganese | 4 to 6 |
| Sodium silicate | 5 to 10 | all parts being by weight.

In other instances, the silico-manganese was omitted without materially detracting from the operation of the electrode in the contact welding operation except that the slag formation was less mobile and did not appear to prevent surface oxidation with the same degree of proficiency. In yet other instances, the calcium fluoride was omitted from the external flux composition resulting in a more tenacious slag requiring considerable brushing and scraping before complete removal from the weldment could be had.

In each case the examples were tested on suitable metal work pieces in such manner that upon touching the rod the work contact was established and the rod dragged across the work. No arc flame was visible from any angle and no helmet or goggles were required, and as the flux melted, it was easy to observe how the weld was progressing. Obviously, this results in a large increase in the efficiency and actual working time of the operator.

After completion of the welding treatments, the cooled covering was noted to contain an external unfused coherent strata which was recovered and reused without loss of efficiency. The underlying strata had fused into a slag which was easily removed in large scale-like fragments.

The process herein disclosed is applicable to substantially all type welding operations and the like, including overlying, hardfacing, tack welding, spot welding, filling, joining, etc. The special secondary coating can be readily applied directly over substantially any type coated or uncoated electrode including steel, alloy steel, cast iron and non-ferrous alloys in the form of fine granular particles held together in an adherent mass by a conventional binder such as water glass, gum arabic, lacquers, resins or the like. Naturally, the choice of the binder will depend upon the temperature at which the operation is conducted and should be chosen so as to prevent premature disintegration of the auxiliary covering.

Among the paramount advantages of the invention are the elimination of the need for using a welder's helmet, an increase in the deposition rate, increased visual control, reduction in overall heat generation by reason of retarded cooling, increased machinability, and easy slag removal.

Obviously many modifications and variations of the present invention are possible in the light of the above teachings. It is, therefore, to be understood that within the scope of the appended claims the invention may be practiced otherwise than as specifically described.

What is claimed is:

1. A covered electrode for use in arc welding operations and including a conductive metallic core, a first covering comprising an intimate mixture of conventional electrode covering ingredients adapted to function as fluxing agents, slag-forming agents, arc stabilizers, deoxidizers, shielding gas formers, and alloying constituents, a second overlying covering material forming an external coating and consisting essentially of a mixture in parts by weight of approximately equal parts of silica and manganese dioxide held together in an adherent mass by a conventional binder material which is compatible with formation of a heavy blanket of molten flux from said second overlying covering material and prevents premature disintegration of said second coating until optimum deposition temperatures are reached, said second coating being at least as thick as said first coating and the radial thickness of the total flux covering on said core being a minimum of twice the overall thickness of said metallic core.

2. A covered electrode for use in arc welding operations as set forth in claim 1 in which said second coating includes up to 15% by weight of a modifying agent selected from the group consisting of arc stabilizers selected from the group consisting of iron oxide and titanium dioxide and alloying constituents selected from the group consisting of iron and iron-aluminum alloy.

3. A covered electrode for use in arc welding operations as set forth in claim 1 in which said second overlying covering material includes smaller amounts of approximately 10% by weight of the equal parts of silica and manganese dioxide of each of calcium fluoride and silico manganese, and in which said binder is sodium silicate.

4. A covered electrode for use in arc welding operations as set forth in claim 1 in which said second overlying covering material consists in parts by weight of between 35 and 50 parts silica, 35 and 50 parts manganese dioxide, between 3 and 5 parts calcium fluoride, between 4 and 6 parts silico-manganese, and between 5 and 10 parts sodium silicate.

5. A covered electrode for use in arc welding operations and including a conductive metallic core, a first covering overlying said conductive core and comprising an intimate mixture essentially consisting of between 40 and 45% titanium dioxide, between 10 and 15% potassium aluminum silicate, between 10 and 15% sodium potassium aluminum silicate, between 5 and 7.5% potassium titanate, between 2 and 5% calcium magnesium carbonate, between 1 and 2% ferro vanadium, between 1 and 2% organic filler, between 3 and 4% ferro manganese, between 1 and 2% aluminum silicate, and between 2 and 5% aluminum oxide, and a second overlying covering material forming an external coating and essentially consisting of a mixture of between 35 and 50% of silica, between 35 and 50% of manganese dioxide, between 3 and 5% of calcium fluoride, between 4 and 6% silico manganese, and between 5 and 10% sodium silicate, all parts being percentages by weight and the total radial thickness of the overall flux covering on said metallic core being at least equal to twice the thickness of said core.

6. A covered electrode as set forth in claim 1 wherein the radial thickness of said first coating is approximately equal to one-half the overall thickness of said metallic core and said second coating is approximately three times as thick as said first coating.

7. A covered electrode as set forth in claim 1 wherein said overall thickness of said conductive metallic core is approximately ⅛ inch, the radial thickness of said first covering is approximately 1/16 inch, and the radial thickness of said second coating is approximately ¼ inch.

References Cited in the file of this patent

UNITED STATES PATENTS 2,552,176  Hummitzsch _____ May 8, 1951